(12) United States Patent
Jacobs

(10) Patent No.: US 9,773,115 B2
(45) Date of Patent: *Sep. 26, 2017

(54) OUT OF BAND MANAGEMENT OF BASIC INPUT/OUTPUT SYSTEM SECURE BOOT VARIABLES

(71) Applicant: CISCO TECHNOLOGY, INC., San Jose, CA (US)

(72) Inventor: William E. Jacobs, Beaverton, OR (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,502

(22) Filed: Dec. 17, 2015

(65) Prior Publication Data

US 2016/0103995 A1     Apr. 14, 2016

Related U.S. Application Data

(63) Continuation of application No. 13/901,281, filed on May 23, 2013, now Pat. No. 9,235,710.

(51) Int. Cl.
*G06F 21/57* (2013.01)
*G06F 21/51* (2013.01)
*G06F 9/445* (2006.01)

(52) U.S. Cl.
CPC ............ *G06F 21/575* (2013.01); *G06F 9/445* (2013.01); *G06F 21/51* (2013.01); *G06F 21/572* (2013.01); *G06F 2221/033* (2013.01)

(58) Field of Classification Search
CPC ....... G06F 21/51; G06F 21/572; G06F 21/575
See application file for complete search history.

(56) References Cited

U.S. PATENT DOCUMENTS

| | | |
|---|---|---|
| 7,873,822 B2 | 1/2011 | Kim et al. |
| 7,987,351 B2 | 7/2011 | Dellow |
| 9,235,710 B2 | 1/2016 | Jacobs |
| 2001/0007131 A1 | 7/2001 | Galasso et al. |
| 2005/0076226 A1 | 4/2005 | Boivie et al. |
| 2006/0112266 A1 | 5/2006 | Little et al. |
| 2006/0253702 A1 | 11/2006 | Lowell |
| 2007/0192610 A1 | 8/2007 | Chun et al. |
| 2009/0006859 A1 | 1/2009 | Zimmer |
| 2009/0113198 A1* | 4/2009 | Liu ................... H04L 41/0803 713/2 |

(Continued)

FOREIGN PATENT DOCUMENTS

| | | |
|---|---|---|
| EP | 1659472 | 5/2006 |
| EP | 2141625 | 1/2010 |
| WO | WO2009/108371 | 9/2009 |

*Primary Examiner* — Dennis M Butler
(74) *Attorney, Agent, or Firm* — Polsinelli PC

(57) ABSTRACT

A method is provided in one example embodiment and includes storing secure boot variables in a baseboard management controller; and sending the secure boot variables to a basic input/output system (BIOS) during a power on self-test, where the BIOS utilizes the secure boot variables during runtime to authenticate drivers and an operating system loader execution. In particular embodiments, the secure boot variables may be included in a white list, a black list, or a key list and, further, stored in erasable programmable read only memory.

19 Claims, 7 Drawing Sheets

(56) References Cited

U.S. PATENT DOCUMENTS

| | | | |
|---|---|---|---|
| 2009/0132799 A1* | 5/2009 | Brumley | G06F 9/44505 713/100 |
| 2009/0249053 A1 | 10/2009 | Zimmer | |
| 2012/0084552 A1* | 4/2012 | Sakthikumar | G06F 21/572 713/100 |
| 2013/0091260 A1* | 4/2013 | Murphy | G06F 8/665 709/221 |
| 2013/0138934 A1* | 5/2013 | Lin | G06F 9/4411 713/1 |
| 2014/0215196 A1* | 7/2014 | Berlin | G06F 21/572 713/2 |
| 2014/0351571 A1 | 11/2014 | Jacobs | |

* cited by examiner

OUT OF BAND MANAGEMENT OF BASIC INPUT/OUTPUT SYSTEM SECURE BOOT VARIABLES

CROSS-REFERENCE TO RELATED APPLICATION

This application is a continuation (and claims the benefit under 35 U.S.C. §120) of U.S. application Ser. No. 13/901,281, filed May 23, 2013, inventor William E. Jacobs, entitled "OUT OF BAND MANAGEMENT OF BASIC INPUT/OUTPUT SYSTEM SECURE BOOT VARIABLES." The disclosure of the prior application is considered part of (and is incorporated by reference in) the disclosure of this application in its entirety.

TECHNICAL FIELD

This disclosure relates in general to the field of communications, and more particularly, to out of band management of basic input/output system secure boot variables.

BACKGROUND

A Unified Extensible Firmware Interface (UEFI) secure boot (as indicated in UEFI 2.3.1c, Approved June 2012) provides that authenticated variables be created to hold signature lists for authorized and forbidden third-party drivers, (e.g., operating system (OS) loaders), and for access control purposes (e.g., authentication of owner and OS entities). The lists (or databases) can be stored in erasable programmable read only memory and used by a basic input/output system (BIOS) to authenticate loading of BIOS drivers such as OS loader and third-party UEFI input/output (I/O) device drivers for preventing the injection of inauthentic code into the BIOS. Typically, the lists (or databases) are created at BIOS build time in a factory setting, and, at that time, inject a static structure into the BIOS image. During OS runtime, the OS may update the lists to change which drivers the BIOS will allow.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes storing secure boot variables in a baseboard management controller; and sending the secure boot variables to a basic input/output system (BIOS) during a power on self-test. The power on self-test can be associated with any particular computer, computing device etc. The BIOS utilizes the secure boot variables during runtime to authenticate drivers and an operating system loader execution. In particular embodiments, the secure boot variables may be included in a white list, a black list, and/or a key list and, further, stored in erasable programmable read only memory.

In other examples, the secure boot variables are Unified Extensible Firmware Interface boot variables. In more particular embodiments, a management server may be enabled to modify the secure boot variables. The secure boot variables can be stored in the form of a signed blob (which could include any suitable data or information). The blob may be populated into the baseboard management controller at provisioning time of a managed server that includes the baseboard management controller.

In a specific example, the blob may be created statically in an off-line environment, signed using secure signing services, and then passed to the baseboard management controller through an update at provisioning time. The off-line environment may be a secure environment. The method may further include receiving, at the baseboard management controller, changes to the secure boot variables made during runtime by the BIOS. In other examples, the method may include where communication between the baseboard management controller and the BIOS uses system management mode code and private interfaces.

Example Embodiments

Figure 1:
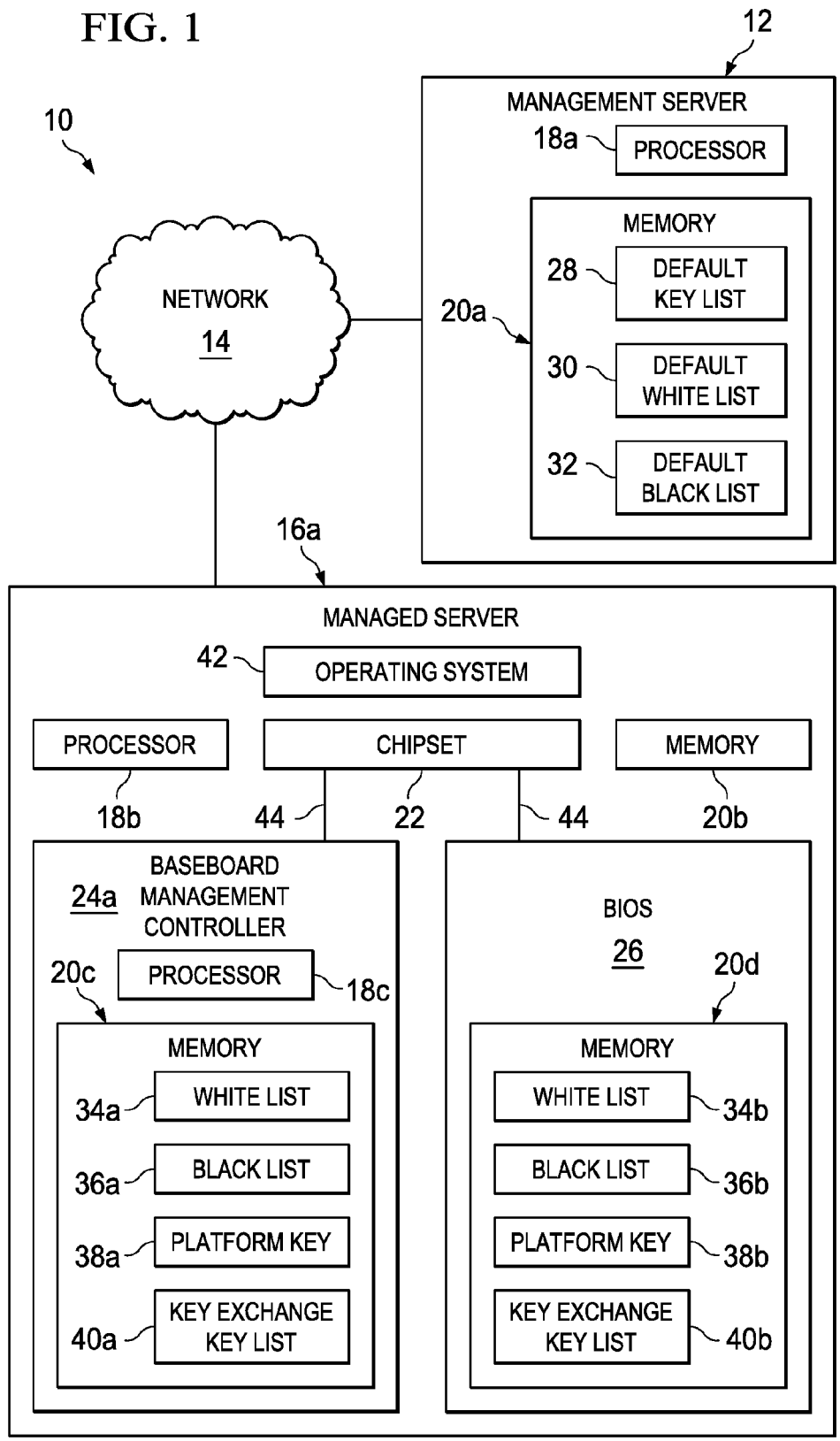
FIG. 1 is a simplified block diagram illustrating an example embodiment of a communication system in accordance with one embodiment of the present disclosure.

Turning to FIG. 1, FIG. 1 is a simplified block diagram of a communication system 10 configured for out of band management of basic input/output system (BIOS) secure boot variables in accordance with one embodiment of the present disclosure. Communication system 10 may include a management server 12, a network 14, and a managed server 16a. Management server 12 may include a processor 18a and a memory 20a. Memory 20a may include a default key list 28, a default white list 30, and a default black list 32. Managed server 16a may include a processor 18b, a memory 20b, a chipset 22, a baseboard management controller 24a, a BIOS 26, and an operating system (OS) 42. Baseboard management controller 24a may include a processor 18c and a memory 20c. Memory 20c may include a white list 34a, a black list 36a, a platform key 38a, and a key exchange key list 40a. BIOS 26 may include a memory 20d. Memory 20d may include a white list 34b, a black list 36b, a platform key 38b, and a key exchange key list 40b. Default key list 28 may include platform keys 38a and 38b. Platform keys 38a and 38b may include the same key. White lists 34a and 34b may each include the same white list. Black lists 36a and 36b may each include the same black list. Key exchange key lists 40a and 40b may each include the same key exchange key lists. Key exchange key lists 40a and 40b may each contain cryptographic keys to facilitate the exchange of cryptographic data.

In general terms, communication system 10 may be configured to provide a tool to store Unified Extensible Firmware Interface (UEFI) Secure Boot data (per UEFI 2.3.1c approved June 2012) on baseboard management controller 24a and manage the integrity of the data using managed updates (including remote managed updates) to BIOS 26 and management server 12 provisioning schemes. Baseboard management controller 24a can be configured to securely store UEFI secure boot authenticated variable data (e.g., white list 34a and black list 36s) in a way that associates the data with a specific managed server (e.g., managed server 16a).

Runtime changes made to UEFI secure boot data in baseboard management controller 24a may be done in a safe and secure manner while also allowing BIOS 26 to be updated via out-of-band methods through baseboard management controller 24a. In one example, a secure interface between BIOS 26 and baseboard management controller 24a can be utilized to pass the UEFI secure boot authenticated variable data. Communication system 10 can be configured to allow the secure boot data to be updated using secure off-line processes. Communication system 10 can also be configured to manage the secure boot data via out of band methods with central capabilities of managed platform deployments. The secure boot data can also be preserved during a BIOS update.

For purposes of illustrating certain example techniques of communication system 10, it is important to understand the communications that may be traversing the network. The following foundational information may be viewed as a basis from which the present disclosure may be properly explained.

UEFI secure boot (per UEFI 2.3.1c) provides that authenticated variables be created to hold signature lists for authorized and forbidden third-party drivers, (e.g., OS loaders) and for access control purposes (e.g., authentication of owner and OS entities). Access to these lists or databases (e.g., white list 34a, black list 36a, and key exchange key list 40a) can be authenticated to prevent subversion of an OS load. For example, platform key 38a may facilitate authentication of the lists. The lists can be used by BIOS 26 to authenticate loading of BIOS (UEFI) drivers such as an OS loader (e.g., WINDOWS® 8), and third-party UEFI I/O device drivers (formerly known as OptionROMS) as a tool to prevent injection of non-authentic code into BIOS 26. Non-authentic code in BIOS 26 can execute a Denial of Service (DoS) attack, capture control of BIOS 26 and inject root kit code, or other malicious activity.

Typically, the lists are created at BIOS 26 during build time in a factory setting, and, at that time, a static structure of the lists is injected into the BIOS image. The injected lists are built or converted into UEFI authenticated variables and BIOS 26 typically requires authentication before allowing further access to the lists. At OS runtime, OS 42 may, using BIOS services, update the white and black lists to change which drivers (e.g., OS loaders, etc.) BIOS 26 will allow. Such changes made at runtime need to be preserved, by specification, across BIOS updates and platform reboots.

However, in a platform that utilizes out of band BIOS image management (e.g., CISCO® UCS B-Series Blade Servers), these variables can become out-of-sync if OS runtime changes to them are made. Some servers may employ a scheme where a BIOS is updated through a 'back door' controlled by a management server. In some examples, a BIOS update can occur without notification for the BIOS to retain state data in the lists. Further, the principles of statelessness of some servers dictates that any such platform-specific deployment data be retained off of the platform itself so as to be manageable by the server. The lists are special in that they must remain secure, even in their backed up state.

Therefore, a tool to manage these lists (that can contain secure boot variables) outside of the platform's BIOS is needed. The tool should safely allow storage, update, and retrieval of the lists into immutable non-volatile random access memory (NVRAM) within a baseboard management controller. Also needed is a way to update the lists from a management server, and enable a platform owner the ability to make static changes based on deployment.

It is also desirable to retain the lists in a database within the platform itself, at least through a re-provisioning of the platform which includes a firmware update. Also needed is to preserve a specified set of authentication information in a manner that is stateless, robust, and immune to BIOS updates while retaining compliance with UEFI 2.3.1c and OS (e.g., MICROSOFT® Windows 8/Server 2012) requirements. The requirements for such a system differs generally from other schemes which may secure a channel between the management server and the managed server to download an image or configuration because in such schemes, the image or configuration is not served from a management server nor is the system operating in a robust post-BIOS environment.

In accordance with one example implementation of the present disclosure, communication system 10 can resolve the aforementioned issues (and potentially others) associated with out of band management of BIOS secure boot variables. In an example implementation, baseboard management controller 24a can be configured to manage UEFI secure boot variables, or any UEFI authenticated variable, by utilizing a proxy storage device (e.g., memory 20c) tied to a server management infrastructure, (e.g., baseboard management controller 24a).

Using this implementation, memory 20c in baseboard management controller 24a can be used to store the UEFI secure boot variables (e.g., white list 34a, black list 36a, and platform key 38a) in the form of a monolithic signed blob, which may be populated into baseboard management controller 24a at server (e.g., managed server 24a) provisioning time. This can enable management server 12 to modify these lists per deployment requirements (e.g., OS supported, driver revision blacklisting, etc.). The blob may be read from baseboard management controller 24a when BIOS 26 boots up early in a power on self-test (POST).

The blob can include default key list 28 (which can include platform keys 38 and 38b), default while list 30, and default black list 32. The blob can be created statically in an off-line secure environment, signed using secure signing services, and then passed to baseboard management controller 24a through an update at a provisioning time for managed server 16a. Baseboard management controller 24a can store the signed blob of data in memory 20c.

Baseboard management controller 24a can make the blob of data available to BIOS 26 through a secure channel 44 established across chipset 22 when requested by BIOS 26. When BIOS 26 boots, BIOS 26 can request the blob of data from baseboard management controller 24a and then use the contents of the blob to populate white list 34b, black list 36b, platform key 38b, and key exchange key list 40b in memory 20d. BIOS 26 may then utilizes these variables locally during runtime (per UEFI 2.3.1c specification) to authenticate UEFI drivers and OS loader execution. BIOS 26 can reflect changes made to these UEFI authenticated variables at runtime, as allowed by an authorized OS, back to baseboard management controller 24a if and when the changes are made. This can be done using system management mode (SMM) code and private interfaces from BIOS 26 to baseboard management controller 24a.

During OS runtime, BIOS 26 can accommodate updates to white list 34b and black list 36b by authenticated OS accesses (e.g., using platform key 38b or key exchange key list 40b). This enables OS 42 to change the contents of white list 34b and black list 36b to control what BIOS 26 allows and disallows on subsequent boot cycles, as per UEFI specifications. Because BIOS 26 may be updated asynchronously and without notification, to retain these updates, BIOS 26 can communicate, during runtime, any changes to these lists back to baseboard management controller 24a, across secure channel 44, to securely store the changed lists. In one example, communication of changes to the lists may be accomplished using secure SMM handler code. In this manner, the requirements of the UEFI 2.3.1c specification, OS requirements, and UCSM statelessness may be achieved. Communication system 10 can be configured such that the code dependent BIOS secure boot variables reside outside BIOS 26 to avoid problem on BIOS updates. More specifically, white list 34a and black list 36a can be kept in baseboard management controller 24a and used/updated through SMM communication between baseboard management controller 24a and BIOS 26.

Turning to the example infrastructure associated with present disclosure, management server 12 and managed server 16a (and managed servers 16b and 16c (shown in FIG. 2) can be associated with devices or users wishing to receive or communicate data or content in communication system 10 via some network. The term 'server', 'management server', and 'managed server' are inclusive of a physical computer (a computer hardware system) or virtual machine dedicated to run one or more services (as a host) and to serve the needs of users of other computers on a network. Depending on the computing service that the managed server offers, managed server could be a database server, file server, mail server, print server, web server, gaming server, or some other kind of server. Managed servers 16a-c may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Network 14 and a network 46 (shown in FIG. 2) represent a series of points or nodes of interconnected communication paths for receiving and transmitting packets of information that propagate through communication system 10. Networks 14 46 offer a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures, and data over cable service interface specification (DOCSIS) cable television (CATV). The architecture can also operate in junction with any 3G/4G/LTE cellular wireless and WiFi/WiMAX environments. The architecture of the present disclosure may include a configuration capable of transmission control protocol/internet protocol (TCP/IP) communications for the transmission and/or reception of packets in a network.

Default key list 28, default white list 30, default black list 32, white lists 34a and 34b, black lists 36a and 36b, platform keys 38a and 38b, and key exchange key lists 40a and 40b may each contain secure variables. Typically, a secure variable cannot be updated unless the user or entity attempting the update can prove (with a digital signature on a specified payload called a platform key variable or an authentication descriptor) that they possess the private part of the key used to create the variable. When a platform is in a setup mode, the secure variables may be altered without the usual authentication checks (although the secure variable writes must still contain an authentication descriptor for the initial key and update type but the actual authentication information is not checked). Platform key 38a may be the key to the platform and can be stored as a platform key variable. Platform key 38a can control access to the platform key variable and a key exchange key variable. In most implementations, only one key at a time may be stored as a platform key variable. If the platform key variable is cleared (either by an authenticated variable write or by a special user present firmware action), the platform must immediately enter setup mode. A key exchange key variable contained in key exchange key list 40a may be used to update the lists (e.g., signature database) and can be used either to update a current list or to sign binaries for valid execution.

Baseboard management controller 24a is a network element that can facilitate the out of band management of BIOS secure boot variables as discussed herein. As used herein in this Specification, the term 'network element' is meant to encompass any of the aforementioned endpoints, as well as routers, switches, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, baseboard management controller 24a may include software to achieve (or to foster) activities associated with out of band management of BIOS secure boot variables, as discussed herein. Additionally, each element can have an internal structure (e.g., a processor, a memory element, etc.) to facilitate some of the operations described herein. In other embodiments, the out of band management of BIOS secure boot variables may be executed externally to baseboard management controller 24a, or included in some other network element to achieve the intended functionality. Alternatively, baseboard management controller 24a may include software (or reciprocating software) that can coordinate with other network elements in order to achieve the support of out of band management of BIOS secure boot variables as described herein. In still other embodiments, one or several devices may include any suitable algorithms, hardware, software, components, modules, interfaces, or objects that facilitate the operations thereof.

Figure 2:
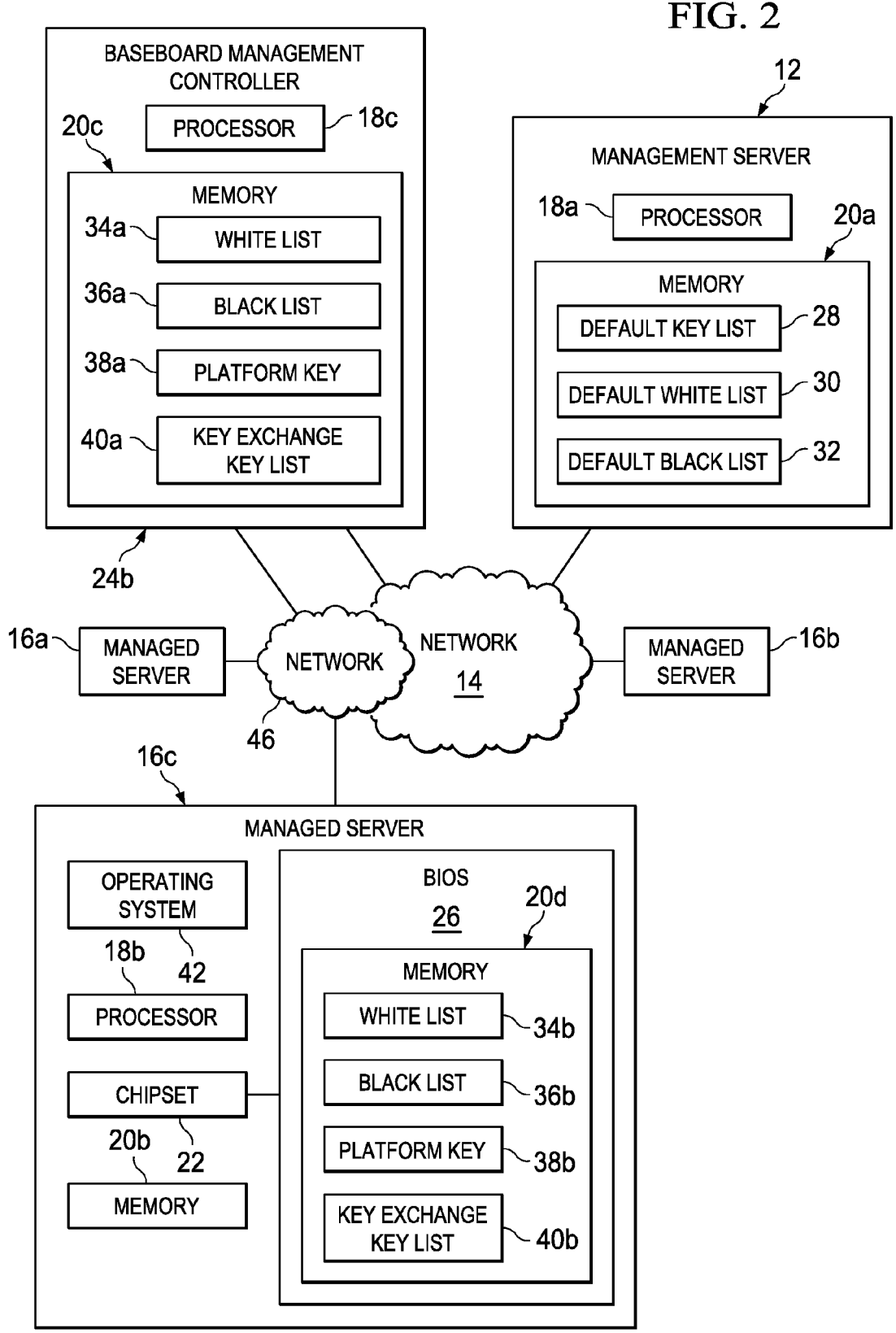
FIG. 2 is a simplified block diagram illustrating an example embodiment of a communication system in accordance with one embodiment of the present disclosure.

Turning to FIG. 2, FIG. 2 is a simplified block diagram of communication system 10 configured for out of band management of BIOS secure boot variables in accordance with one embodiment of the present disclosure. Communication system 10 may include management server 12, network 14, managed servers 16a-c, baseboard management controller 24b, and network 46. Management server 12 may include processor 18a and memory 20a. Memory 20a may include default key list 28, default white list 30, and default black list 32. Managed server 16c may include processor 18b, memory 20b, chipset 22, and BIOS 26. BIOS 26 may include memory 20d. Memory 20d may include white list 34b, black list 36b, platform key 38b, and key exchange key list 40b. Baseboard management controller 24b may include processor 18c and memory 20c. Memory 20c may include white list 34a, black list 36a, platform key 38a, and key exchange key list 40a. Baseboard management controller 24b may communicate with one or more managed servers 16a-c through network 14 and/or network 46. Network 46 may be isolated from network 14.

Figure 3:
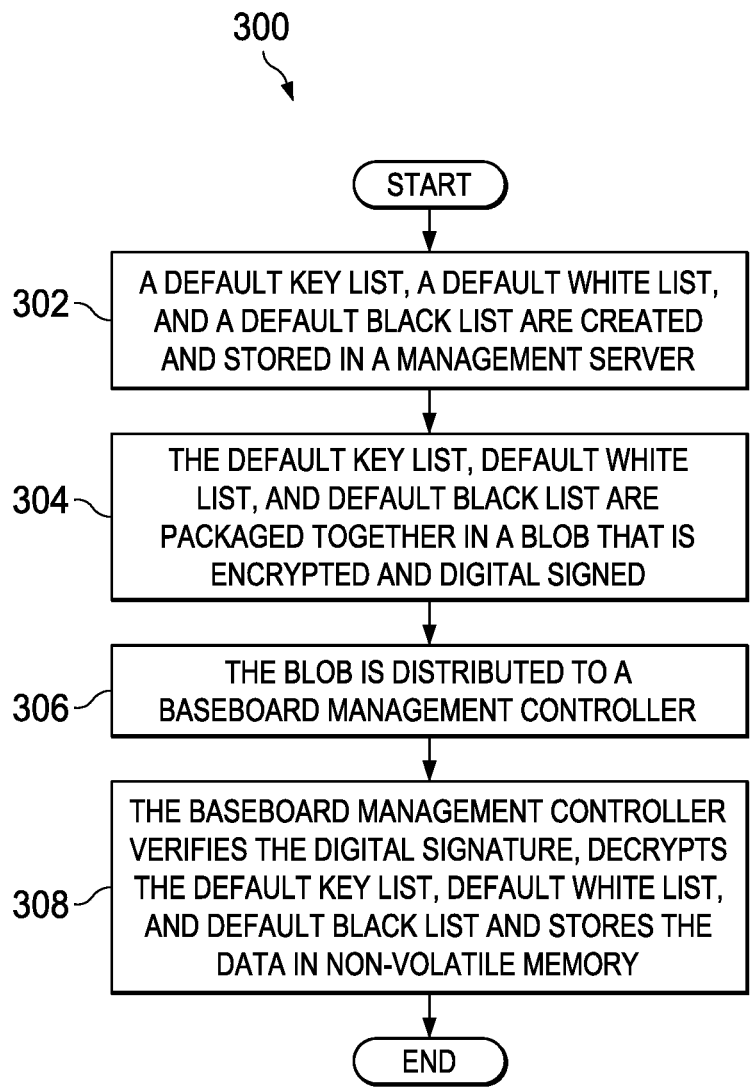
FIG. 3 is a simplified flow diagram illustrating one possible set of activities associated with the communication system.

Turning to FIG. 3, FIG. 3 is a simplified flowchart 300 illustrating example activities associated with out of band management for BIOS secure boot variables. At 302, a key list, a default white list, and a default blacklist are created and stored in a management server. At 304, the default key list, default white list, and default blacklist are packaged together in a blob that is encrypted and digitally signed. At 306, the blob is distributed to a baseboard management controller. In an example, the blob is securely distributed to a baseboard management controller. At 308, the baseboard management controller verifies the digital signature, decrypts the default key list, default white list, and default blacklist and stores the data in non-volatile memory.

Figure 4:
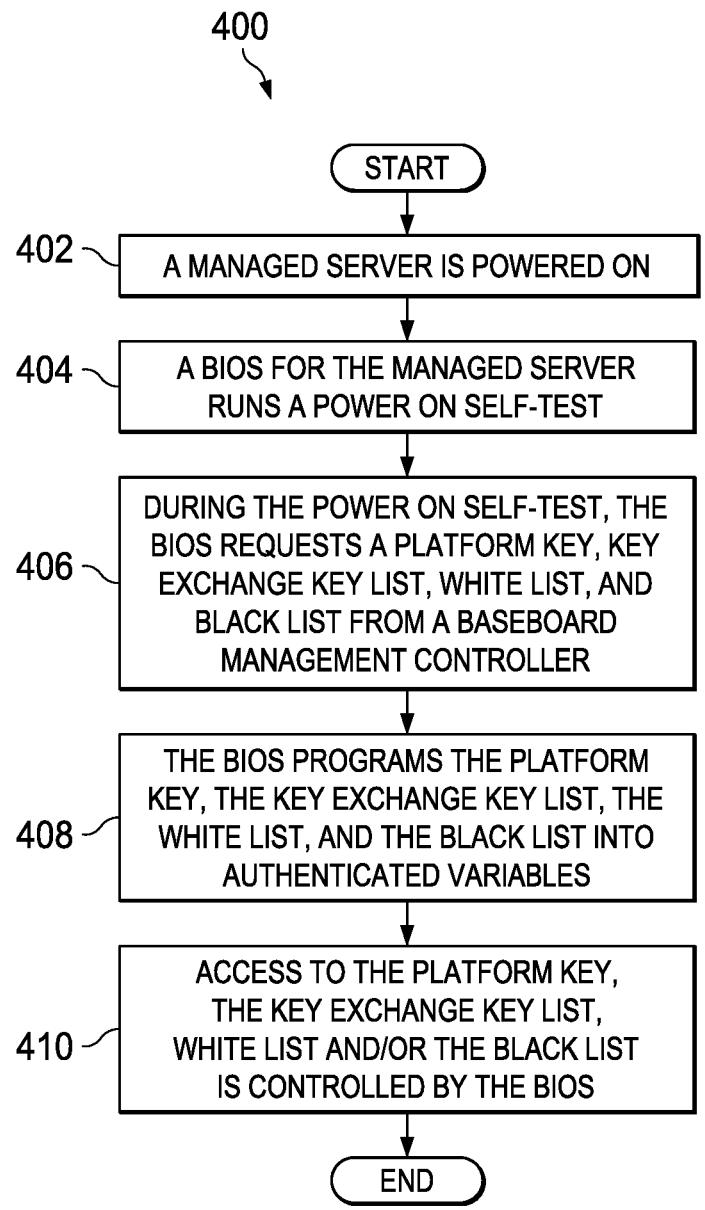
FIG. 4 is a simplified flow diagram illustrating one possible set of activities associated with the communication system.

Turning to FIG. 4, FIG. 4 is a simplified flowchart 400 illustrating example activities associated with out of band management for BIOS secure boot variables. At 402, a managed server is powered on. At 404, a BIOS for the managed server runs a power on self-test. At 406, during the power on self-test, the BIOS requests a platform key, key exchange key list, white list, and black list from a baseboard management controller. In an example, the platform key, key exchange key list, white list and black list are included in a blob of data sent to the BIOS from the baseboard management controller. At 408, the BIOS programs the platform key, key exchange key list, white list, and black list into authenticated variables (e.g., BIOS secure boot variables). At 410, access to the platform key, key exchange key list, white list and black list is controlled by the BIOS.

Figure 5:
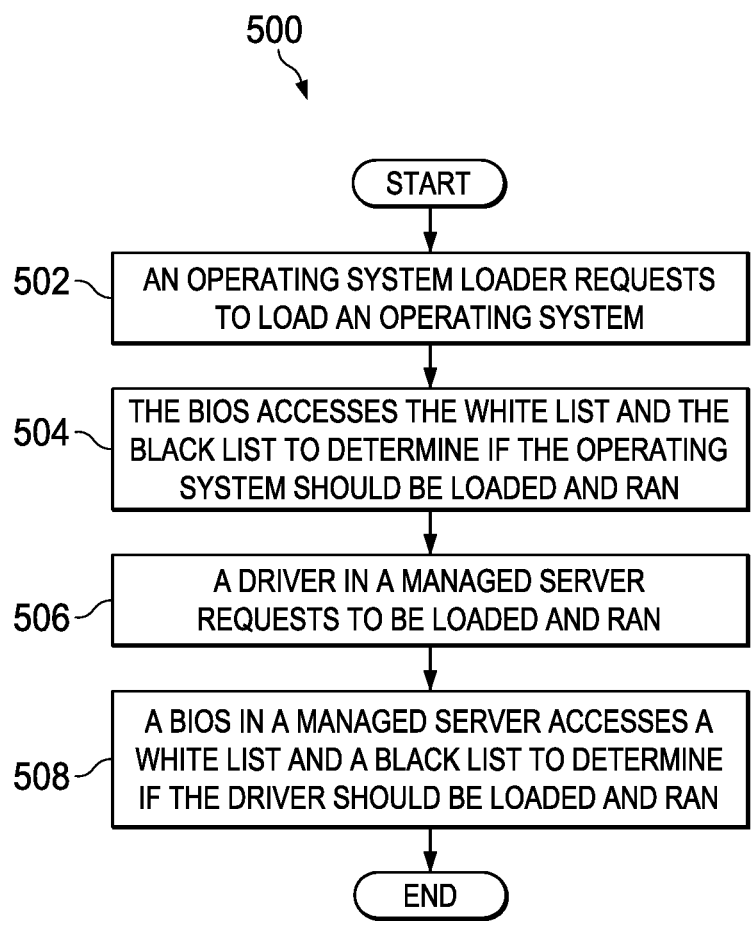
FIG. 5 is a simplified flow diagram illustrating one possible set of activities associated with the communication system.

Turning to FIG. 5, FIG. 5 is a simplified flowchart 500 illustrating example activities associated with out of band management for BIOS secure boot variables. At 502, an OS loader requests to load an OS. At 504, the BIOS accesses a white list and a black list to determine if the OS should be loaded and ran. For example, if the OS is included in the white list, then the OS is loaded and allowed to run. Conversely, if the OS is included in the black list, then the OS is not loaded and not allowed to run. In an implementation, if the OS is not included in the white list or the black list, then remedial action is taken. For example, a user managing the system real-time may be notified and the fact that the OS was not listed may be logged. If the OS is not included in the white list or the black list, then typically the system is misconfigured.

At 506, a driver in a managed server requests to be loaded and ran. At 508, a BIOS in a managed server accesses a white list and a black list to determine if the driver should be loaded and run. For example, if the driver is included in the white list, then the driver is loaded and allowed run. Conversely, if the driver is included in the black list, then the driver is not loaded and not allowed to run. In an implementation, if the driver is not included in the white list or the black list, then remedial action is taken. For example, a user managing the system real-time may be notified and the fact that the driver was not listed may be logged. If the driver is not included in the white list or the black list, then typically the system is misconfigured.

Figure 6:
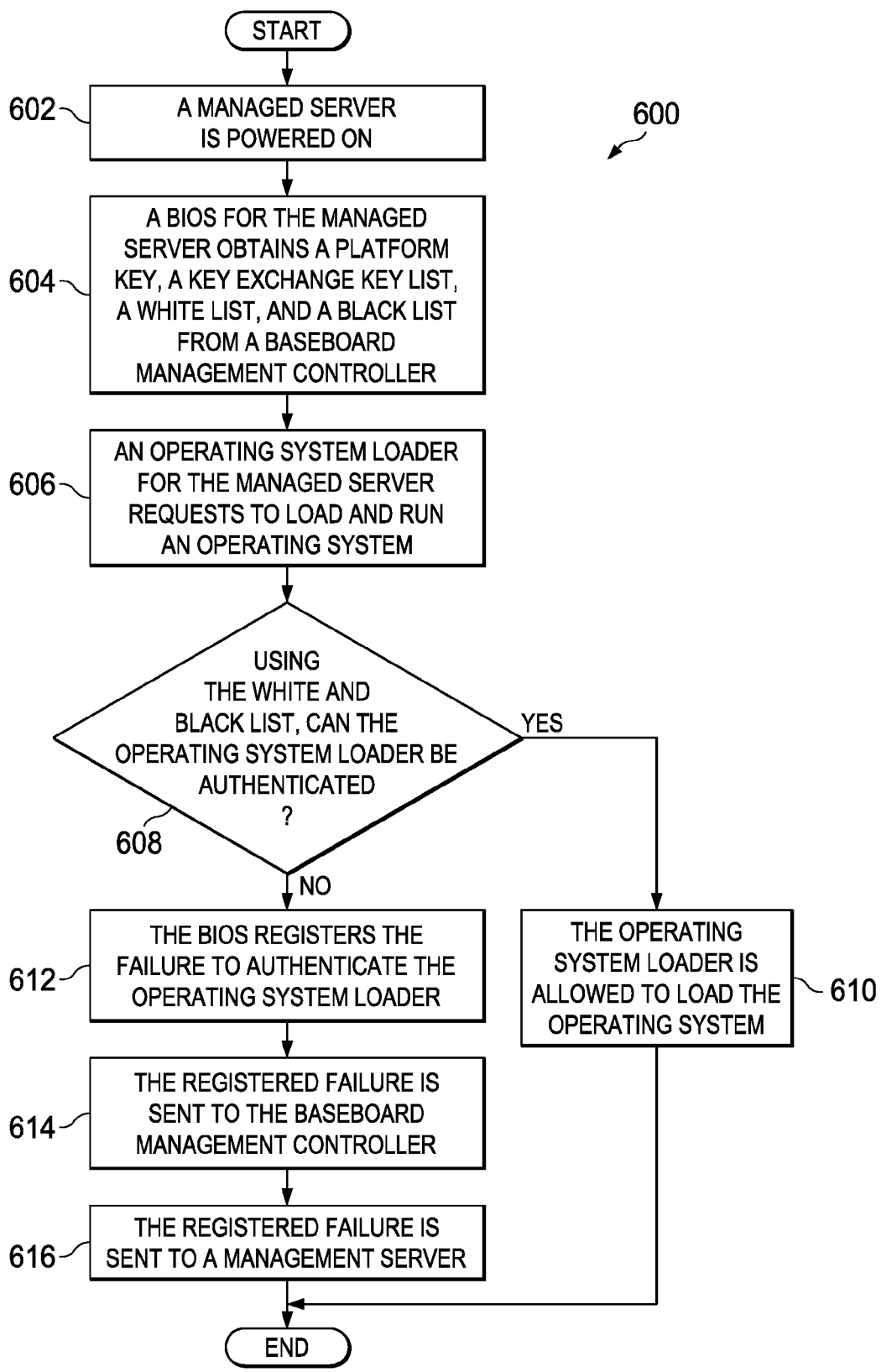
FIG. 6 is a simplified flow diagram illustrating one possible set of activities associated with the communication system.

Turning to FIG. 6, FIG. 6 is a simplified flowchart 600 illustrating example activities associated with out of band management for BIOS secure boot variables. At 602, a managed server is powered on. At 604, a BIOS for the managed server obtains a platform key, a key exchange key list, a white list, and a black list from a baseboard management controller. In one example, the platform key, key exchange key list, white list, and black list may be included in a blob. At 606, an OS loader for the managed server requests to load and run an OS. At 608, using the white list and the black list, the system determines if the OS loader can be authenticated. If the OS loader can be authenticated, then the OS loader is allowed to load the OS, as in 610. If the OS loader cannot be authenticated, then the BIOS registers the failure to authenticate the OS loader, as in 612. At 614, the registered failure is sent to the baseboard management controller. At 616, the registered failure is sent to a management controller. In an example, the failure is sent to the management server by the baseboard management controller.

Figure 7:
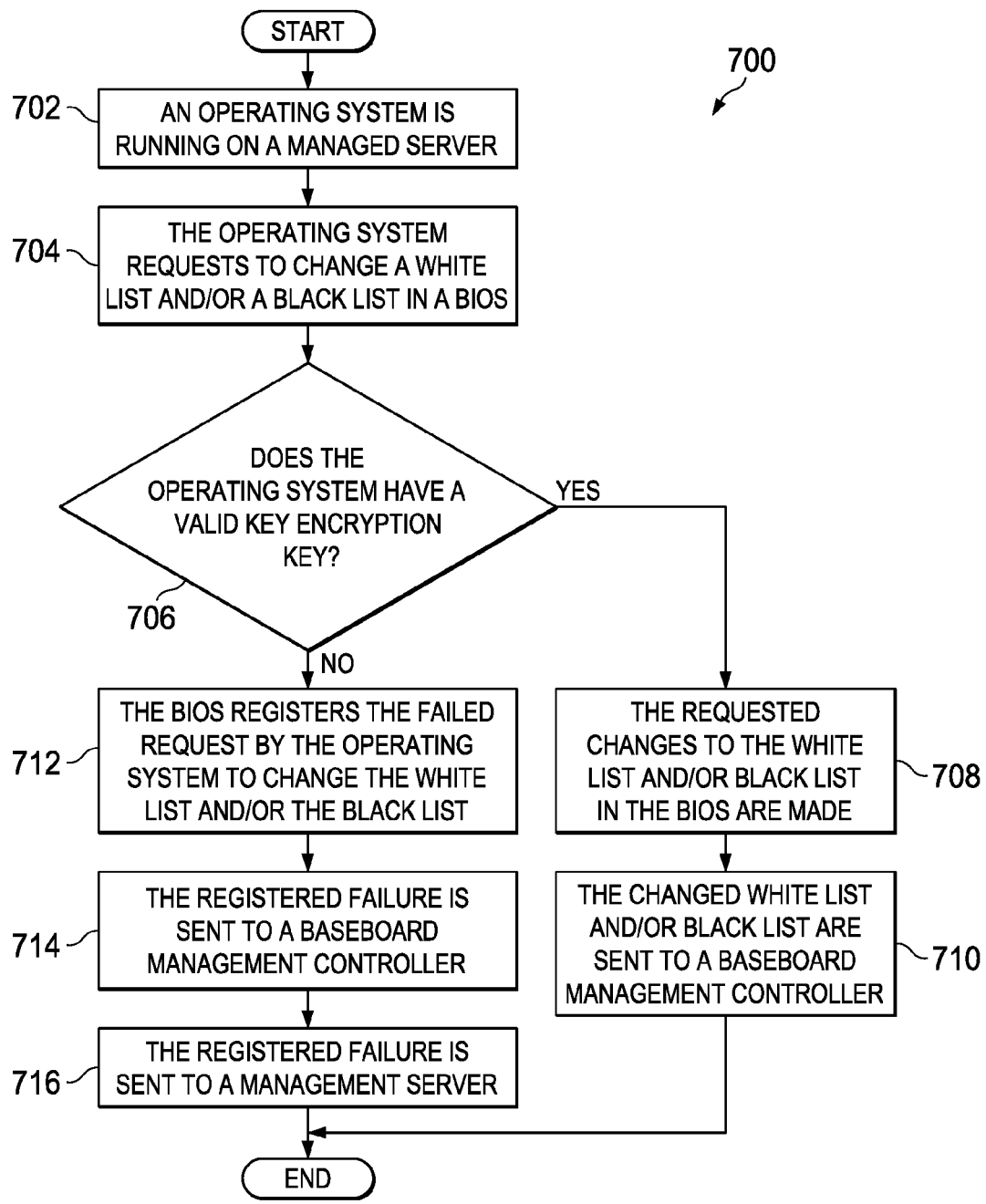
FIG. 7 is a simplified flow diagram illustrating one possible set of activities associated with the communication system.

Turning to FIG. 7, FIG. 7 is a simplified flowchart 700 illustrating example activities associated with out of band management for BIOS secure boot variables. At 702, an OS is running on a managed server. At 704, the OS requests to change a white list and/or black list in a BIOS. At 706, the system determines if the OS has a valid key encryption key. For example, the BIOS may use a key exchange key list (e.g., key exchange key list 40b) to determine if the OS has a valid encryption key. If the OS has a valid key encryption key, then the requested changes to the white list and/or the black list in the BIOS are made, as in 708. At 710, the changed white list and/or black list are sent to a baseboard management controller. If the OS does not have a valid encryption key, then the BIOS registers the failed request by the OS to change the white list and/or the black list, as in 712. At 714, the registered failure is sent to a baseboard management controller. At 716, the registered failure is sent to a management controller. In an example, the failure is sent to the management server by the baseboard management controller.

As identified previously, a network element can include software (e.g., baseboard management controller 24a, etc.) to achieve out of band management of BIOS secure boot variables, as outlined herein in this document. In certain example implementations, the functions for out of band management of BIOS secure boot variables as outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor [processors 18a-c shown in FIGS. 1 and 2], or other similar machine, etc.).

In some of these instances, a memory element [memory 20a-d shown in FIGS. 1 and 2] can store data used for the operations described herein. This includes the memory element being able to store instructions (e.g., software, code, etc.) that are executed to carry out the activities described in this Specification. The processor (e.g., processors 18a-c) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in supporting the out of band management of BIOS secure boot variables, as outlined herein. Additionally, each of these devices may include a processor that can execute software or an algorithm to perform the activities of out of band management of BIOS secure boot variables as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for updating secure boot varibles for authenticating drivers, comprising:
    storing secure boot variables in a baseboard management controller as a signed blob at a provisioning time of a managed server that includes the baseboard management controller;
    sending the secure boot variables from the baseboard management controller to a basic input/output system (BIOS) during a power on self-test; and
    authenticating drivers, by the BIOS, using the secure boot variables.

2. The method of claim 1, wherein the secure boot variables are sent in response to a request, from the BIOS, for the secure boot variables.

3. The method of claim 1, wherein the secure boot variables are associated with a specific managed server.

4. The method of claim 1, further comprising:
    enabling a management server to modify the secure boot variables.

5. The method of claim 1, wherein the blob is created statically in an off-line secure environment, signed using secure signing services, and passed to the baseboard management controller through an update at the provisioning time.

6. The method of claim 1, further comprising:
    receiving, at the baseboard management controller, changes to the secure boot variables made during runtime by the BIOS.

7. The method of claim 1, wherein communication between the baseboard management controller and the BIOS uses system management mode code and private interfaces.

8. One or more non-transitory media that includes instructions for execution and when executed by a processor is operable to perform operations for updating secure boot varibles for authenticating an operating system loader, comprising:
    storing secure boot variables in a baseboard management controller;
    sending the secure boot variables from the baseboard management controller to a basic input/output system (BIOS) during a power on self-test; and
    authenticating an operating system loader, by the BIOS, using the secure boot variables.

9. The media of claim 8, wherein the secure boot variables are sent in response to a request from the BIOS for the secure boot variables.

10. The media of claim 8, wherein the secure boot variables are associated with a specific managed server.

11. The media of claim 8, further comprising instructions for:
enabling a management server to modify the secure boot variables.

12. The media of claim 8, wherein the secure boot variables are stored as a signed blob, wherein the signed blob is populated into the baseboard management controller at a provisioning time of a managed server that includes the baseboard management controller.

13. The media of claim 12, wherein the blob is created statically in an off-line secure environment, signed using secure signing services, and passed to the baseboard management controller through an update at the provisioning time.

14. The media of claim 8, further comprising instructions for:
receiving, at the baseboard management controller, changes to the secure boot variables made during runtime by the BIOS.

15. The media of claim 8, wherein communication between the baseboard management controller and the BIOS uses system management mode code and private interfaces.

16. A network element for updating secure boot variables for authenticating drivers, comprising:
a memory element for storing instructions; and
a processor coupled to the memory element and operable to execute instructions such that the network element is configured to:
store secure boot variables in a baseboard management controller, wherein the secure boot variables are stored as a signed blob, wherein the signed blob is populated into the baseboard management controller at a provisioning time;
send the secure boot variables from the baseboard management controller to a basic input/output system (BIOS) during a power on self-test; and
authenticate drivers, by the BIOS, using the secure boot variables.

17. The network element of claim 16, wherein the secure boot variables are sent in response to a request from the BIOS for the secure boot variables.

18. The network element of claim 16, wherein the secure boot variables are associated with a specific managed server.

19. The network element of claim 16, wherein the baseboard management controller is configured to receive changes to the secure boot variables made during runtime by the BIOS.

* * * * *